United States Patent
Yoon et al.

(10) Patent No.: US 8,965,651 B2
(45) Date of Patent: Feb. 24, 2015

(54) SHIFT CONTROL METHOD FOR VEHICLE HAVING DCT

(71) Applicants: Hyundai Motor Company, Seoul (KR); Kia Motors Corp., Seoul (KR)

(72) Inventors: Young Min Yoon, Seoul (KR); Sung Hyun Cho, Suwon-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 33 days.

(21) Appl. No.: 13/827,059

(22) Filed: Mar. 14, 2013

(65) Prior Publication Data

US 2014/0163830 A1    Jun. 12, 2014

(30) Foreign Application Priority Data

Dec. 10, 2012  (KR) .......................... 10-2012-0142613

(51) Int. Cl.
| | | |
|---|---|---|
| *G06F 7/00* | (2006.01) | |
| *G06F 17/00* | (2006.01) | |
| *B60W 10/02* | (2006.01) | |
| *B60W 10/11* | (2012.01) | |

(52) U.S. Cl.
CPC ............... *B60W 10/02* (2013.01); *B60W 10/11* (2013.01)
USPC .......................................................... 701/68

(58) Field of Classification Search
CPC .............................. B60W 10/02; B60W 10/11
USPC ............................................................. 701/68
See application file for complete search history.

(56) References Cited

U.S. PATENT DOCUMENTS

| 5,115,698 A * | 5/1992 | Leising et al. .................. 475/65 |
| 2009/0120710 A1* | 5/2009 | Hasegawa et al. ............ 180/365 |
| 2010/0184561 A1 | 7/2010 | Schaarschmidt et al. |
| 2013/0045833 A1* | 2/2013 | Okubo et al. ..................... 477/5 |

FOREIGN PATENT DOCUMENTS

| JP | 2010-38180 A | 2/2010 |
| JP | 2011-2007 A | 1/2011 |
| KR | 10-2006-0067698 A | 6/2006 |
| KR | 10-2011-0105636 A | 9/2011 |

* cited by examiner

*Primary Examiner* — Mary Cheung
*Assistant Examiner* — Frederick Brushaber
(74) *Attorney, Agent, or Firm* — Morgan, Lewis & Bockius LLP

(57) ABSTRACT

A shift control method for a vehicle having a double clutch transmission may include determining whether or not a speed change may be between transmission gears which may be allocated to a same input shaft, determining whether or not a gear of the input shaft may be released, when the gear of the input shaft may be released, engaging working parts of a clutch of the input shaft with each other in a range before synchronization of a final target transmission gear starts.

4 Claims, 3 Drawing Sheets

SHIFT CONTROL METHOD FOR VEHICLE HAVING DCT

CROSS-REFERENCE TO RELATED APPLICATION

The present application claims priority to Korean Patent Application No. 10-2012-0142613, filed on Dec. 10, 2012, the entire contents of which is incorporated herein for all purposes by this reference.

BACKGROUND OF THE INVENTION

1. Field of the Invention

The present invention relates, in general, to a shift control method for a vehicle having a double clutch transmission (DCT), and more particularly, to a technology for improving a response to a speed change during a kickdown.

2. Description of Related Art

Unlike an automatic transmission (AT) which requires only clutch shifting, a DCT can enable clutch shifting only after gear shifting has been completed. Therefore, in the DCT, gear shifting performance is a key factor for an overall response to speed change. In particular, more rapid gear shifting is required for a kickdown that a driver regards most sensitive for a response to speed change.

For reference, the gear shifting refers to a speed change operation that causes a sleeve to engage with a clutch gear due to them being synchronized using a synchronizer. The clutch shifting refers to a speed change operation that transmits power that has been supplied from an engine to drive wheels by changing its speed substantially using the sleeve, the clutch gear and shift gears by engaging the working parts of a clutch of an input shaft, the gear shifting of which has been completed as described above, with each other. In addition, gear releasing refers to the process in which the sleeve is released and disengaged from the clutch gear.

In order to reduce a time required for the gear shifting, displacement optimization at a point where the synchronization by the synchronizer starts, a reduced time for the synchronizer to carry out the synchronization, displacement optimization at a point where the working parts of the clutch gear are to engage with each other, and the like are required. Among these, most time is consumed in the range of the synchronization by the synchronizer during the gear shifting. Therefore, it is necessary to reduce the time it takes the synchronizer to carry out synchronization.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a shift control method for a vehicle having a double clutch transmission (DCT) in which synchronization can be more rapidly carried out by a synchronizer when a kickdown is required again during an existing kickdown, so that a response to a speed change is improved, thereby improving the quality of the speed change of the vehicle and the merchantability of the vehicle.

In an aspect of the present invention, a shift control method for a vehicle having a double clutch transmission may include determining whether or not a second kickdown is required during a first kickdown, determining whether or not a gear of an input shaft, working parts of a clutch of which are to disengage from each other during the first kickdown, is released when the second kickdown is required during the first kickdown as a result of determining whether or not the second kickdown is required during the first kickdown, when the gear is determined to be released as a result of determining whether or not the gear of the input shaft is released, operating the clutch of the input shaft, the gear of which may have been released, in a direction in which the working parts of the clutch of the input shaft engage with each other, and disengaging the working parts of the clutch from each other when a speed of the input shaft becomes equal to a speed of a power generating unit which supplies power to the clutch or when a synchronization start point of a target transmission gear for the second kickdown may have arrived as a result of operating the clutch of the input shaft.

The first kickdown and the second kickdown may include sequentially carrying out a speed change using a series of transmission gears, ratios of which gradually increase, and a transmission gear which is released at the first kickdown and the target transmission gear which is engaged at the second kickdown are disposed so as to be realized by a same input shaft.

Operating the clutch of the input shaft may include operating the clutch in a direction in which the working parts of the clutch engage with each other so that a torque transmitted via the clutch gradually increases.

Engaging the working parts of the clutch of the input shaft with each other may include driving the clutch so that a clutch torque transmitted via the clutch linearly increases.

In another aspect of the present invention, a shift control method for a vehicle having a double clutch transmission may include determining whether or not a speed change is between transmission gears which are allocated to a same input shaft, determining whether or not a gear of the input shaft is released, when the gear of the input shaft is released, engaging working parts of a clutch of the input shaft with each other in a range before synchronization of a final target transmission gear starts.

Disengaging the working parts of the clutch from each other when a speed of the input shaft becomes equal to a speed of a power generating unit which supplies power to the clutch or before synchronizing of the target transmission gear.

Engaging the working parts of the clutch of the input shaft with each other may include driving the clutch so that a clutch torque transmitted via the clutch linearly increases.

Engaging the working parts of the clutch of the input shaft with each other may include operating an actuator which drives the clutch so that a clutch torque transmitted via the clutch linearly increases.

Accordingly to embodiments of the present invention, it is possible to more rapidly carry synchronization by a synchronizer when a kickdown is required again during an existing kickdown in a vehicle having a DCT, so that a response to a speed change is improved, thereby improving the quality of the speed change of the vehicle and the merchantability of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
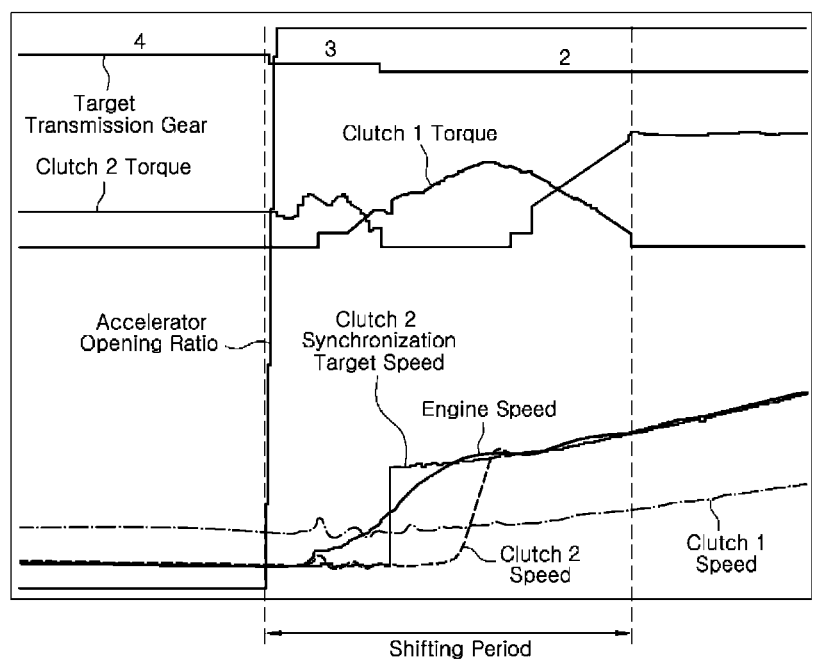
FIG. 1 is a graph illustrating a kickdown that occurs during an existing kickdown in the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Reference will now be made in greater detail to an exemplary embodiment of the present invention, an example of which is illustrated in the accompanying drawings. Wherever possible, the same reference numerals will be used throughout the drawings and the description to refer to the same or like parts.

Figure 2:
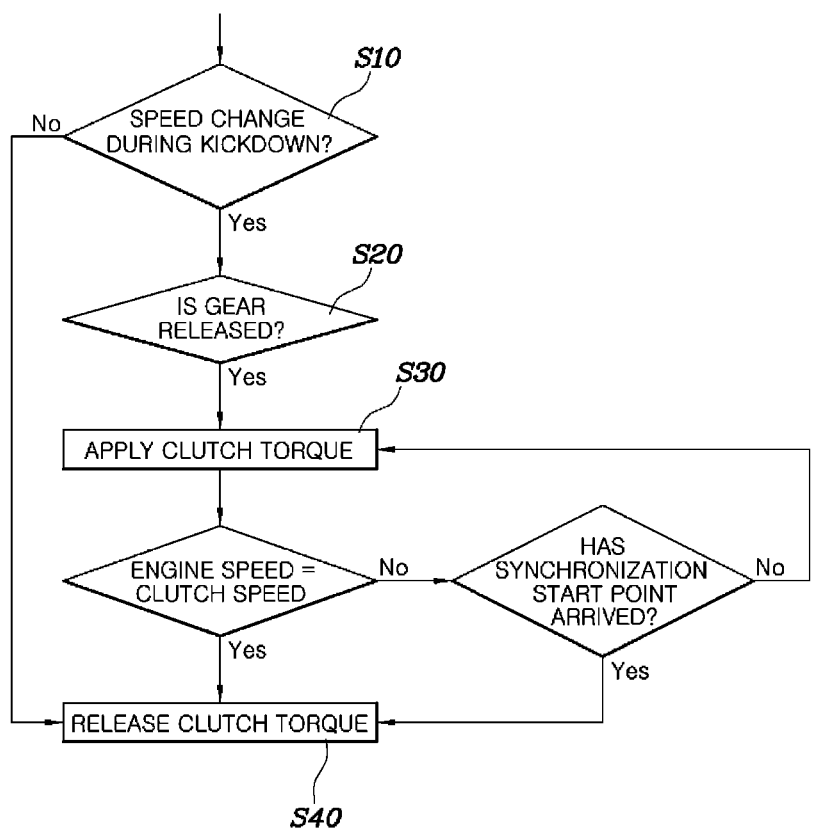
FIG. 2 is a flowchart illustrating an exemplary embodiment of a shift control method for a vehicle having a DCT according to an exemplary embodiment of the present invention.

Referring to FIG. 2, an exemplary embodiment of a shift control method for a vehicle having a double clutch transmission (DCT) according to an exemplary embodiment of the present invention includes a step of determining whether or not a second kickdown is required during a first kickdown (S10), a step of determining whether or not a gear of an input shaft, the working parts of a clutch of which are to disengage from each other during the first kickdown, is released when the second kickdown is required during the first kickdown as a result of the step S10 of determining whether or not the second kickdown is required during the first kickdown (S20), a step of operating, when it is determined that the gear is released as a result of the step S20 of determining whether or not the gear of the input shaft is released, the clutch of the input shaft, the gear of which has been released, in the direction in which the working parts of the clutch engage with each other (S30), and a step of disengaging the working parts of the clutch from each other when the speed of the input shaft becomes the same as the speed of a power generating unit which supplies power to the clutch or when a synchronization start point of a target transmission gear for the second kickdown has arrived as a result of the step S30 of operating the clutch of the input shaft (S40).

The first kickdown and the second kickdown refer to sequential shifting through a series of transmission gears, the ratios of which gradually increase. The transmission gear which is released at the first kickdown and the target transmission gear which is engaged at the second kickdown are realized by the same input shaft.

Figure 3:
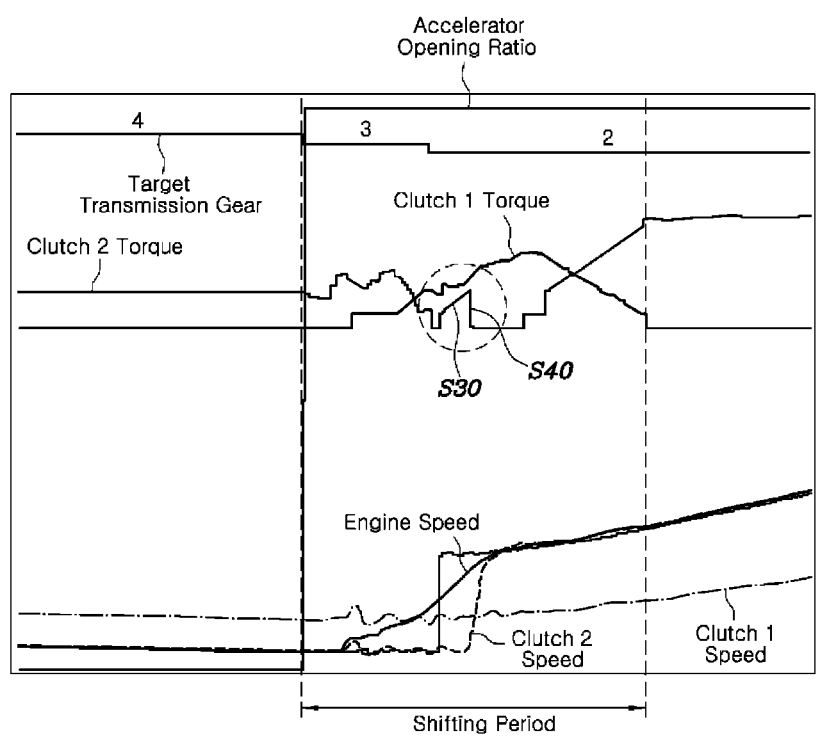
FIG. 3 is a graph illustrating the situation of a kickdown occurs that occurs during an existing kickdown according to an exemplary embodiment of the present invention.

In an example, as shown in FIG. 3, in the situation in which the first kickdown is being carried out from the fourth gear stage to the third gear stage, a speed change into the second gear stage is required due to a request for the second kickdown. Here, the start transmission gear is the fourth gear stage, and the target transmission gear is the second gear stage.

The DCT generally includes two input shafts which are respectively connected to two clutches, in which transmission gears having an odd number are disposed at one of the two input shafts, and transmission gears having an even number are disposed at the other one of the two input shafts. Since a speed change is carried out from the fourth gear stage to the second gear stage in FIG. 3, the step S10 of determining whether or not the second kickdown is required during the first kickdown can be regarded as the step of determining whether the speed change is carried out between transmission gears allocated to the same input shaft.

For reference, in FIG. 1 and FIG. 3, Clutch 1 and Clutch 2 respectively indicate a clutch connected to the input shaft to which the transmission gears having an odd number are allocated and a clutch connected to the input shaft to which the transmission gears having an even number are allocated. Therefore, the speed of Clutch 1 indicates the speed of the input shaft to which the transmission gears having an odd number are allocated, whereas the speed of Clutch 2 indicates the speed of the input shaft to which the transmission gears having an even number are allocated.

In addition, although the power generating unit can be typically an engine, it can also be a motor for recent hybrid or electric vehicles.

When the first kickdown and the second kickdown are required to continue as a result of the step S10, it is determined whether or not the gear of the input shaft is released by executing the step S20 of determining whether or not the gear of the input shaft is released. The speed of the corresponding input shaft is sufficiently increased before synchronization of the target transmission gear by executing the step S30 of operating the clutch of the input shaft and the step S40 of disengaging the working parts of the clutch from each other.

That is, when the gear of the input shaft is released, the speed of the input shaft is increased by engaging and then disengaging the working parts of the clutch of the input shaft with and from each other in the range before synchronization of the final target transmission gear starts. This leads to as great a reduction as possible in the amount of a slip, i.e. a difference in the speed that the synchronizer of the target transmission gear must substantially synchronize. This consequently reduces the time it takes the synchronizer to carry out synchronization, thereby reducing a time for the speed change and improving a response to the speed change.

In the step S30 of operating the clutch of the input shaft, it is preferred that the clutch be operated in the direction in which the working parts of the clutch engage with each other so that the amount of a torque that is transmitted via the clutch gradually increases, thereby preventing impacts that would otherwise be caused a change in inertia in response to the engagement of the working parts of the clutch.

In the step of engaging the working parts of the clutch of the input shaft as shown in FIG. 3, an actuator which drives the clutch is operated so that the amount of a clutch torque that is transmitted via the clutch can linearly increase.

FIG. 1 illustrates a situation of a kickdown during an existing kickdown of the related art, which is compared to FIG. 3 which illustrates the control method according to an exemplary embodiment of the present invention. Referring to FIG. 1, unlike FIG. 3, in the range where the target transmission gear is converted from the third gear stage into the second gear stage, there is no region where the torque of Clutch 2 is linearly increased and then released by the step S30 of operating the clutch and the step S40 of disengaging the working parts of the clutch from each other. Consequently, a time point where the speed of Clutch 2 is synchronized with the speed of the engine is delayed, thereby increasing the time that is consumed for the speed change.

Of course, as described above, after the step S40 of disengaging the working parts of the clutch from each other, the synchronization to the target transmission gear, i.e. the second gear stage, is rapidly carried out, and then the gear shifting is completed. Afterwards, the working parts of the clutch of the input shaft are caused to engage with each other again, so that power can be transmitted from the power generating unit, such as an engine or a motor, thereby finally completing the speed change.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shift control method for a vehicle having a double clutch transmission, comprising:

determining whether or not a second kickdown is required during a first kickdown;

determining whether or not a gear of an input shaft, working parts of a clutch of which are to disengage from each other during the first kickdown, is released when the second kickdown is required during the first kickdown as a result of determining whether or not the second kickdown is required during the first kickdown;

when the gear is determined to be released as a result of determining whether or not the gear of the input shaft is released, operating the clutch of the input shaft, the gear of which has been released, in a direction in which the working parts of the clutch of the input shaft engage with each other; and disengaging the working parts of the clutch from each other when a speed of the input shaft becomes equal to a speed of a power generating unit which supplies power to the clutch or when a synchronization start point of a target transmission gear for the second kickdown has arrived as a result of operating the clutch of the input shaft.

2. The shift control method of claim 1, wherein the first kickdown and the second kickdown include sequentially carrying out a speed change using a series of transmission gears, ratios of which gradually increase, and a transmission gear which is released at the first kickdown and the target transmission gear which is engaged at the second kickdown are disposed so as to be realized by a same input shaft.

3. The shift control method of claim 1, wherein operating the clutch of the input shaft includes operating the clutch in a direction in which the working parts of the clutch engage with each other so that a torque transmitted via the clutch gradually increases.

4. The shift control method of claim 1, wherein engaging the working parts of the clutch of the input shaft with each other includes driving the clutch so that a clutch torque transmitted via the clutch linearly increases.

* * * * *